(12) United States Patent
Smith et al.

(10) Patent No.: US 7,713,313 B1
(45) Date of Patent: May 11, 2010

(54) PROCESS FOR PREPARING LITHIUM MANGANATE

(75) Inventors: W. Novis Smith, Philadelphia, PA (US); Joel R. McCloskey, Philadelphia, PA (US); Joseph B. Kejha, Meadowbrook, PA (US); James J. Gormley, Ardsley, PA (US)

(73) Assignee: Lithdyne LLC, Anaheim, CA (US)

( * ) Notice: Subject to any disclaimer, the term of this patent is extended or adjusted under 35 U.S.C. 154(b) by 1059 days.

(21) Appl. No.: 11/403,326

(22) Filed: Apr. 13, 2006

(51) Int. Cl.
*H01M 6/00* (2006.01)
*H01M 4/00* (2006.01)
*H01M 4/50* (2006.01)

(52) U.S. Cl. .................. 29/623.1; 429/128; 429/224

(58) Field of Classification Search ............ None
See application file for complete search history.

(56) References Cited

U.S. PATENT DOCUMENTS

| 5,561,006 | A | * | 10/1996 | Lecerf et al. ............ 429/224 |
| 5,605,773 | A | * | 2/1997 | Ellgen .................... 429/224 |
| 5,747,193 | A | * | 5/1998 | Gerand et al. ........... 429/224 |
| 5,939,043 | A | * | 8/1999 | Yahagi ................... 423/599 |
| 6,787,232 | B1 | * | 9/2004 | Chiang et al. ........... 428/403 |
| 2001/0033972 | A1 | * | 10/2001 | Kawai et al. .......... 429/231.95 |
| 2005/0019659 | A1 | * | 1/2005 | Shiozaki et al. ......... 429/231.3 |
| 2006/0019166 | A1 | * | 1/2006 | Numata et al. .......... 429/224 |

* cited by examiner

*Primary Examiner*—Robert Hodge
(74) *Attorney, Agent, or Firm*—John Lezdey

(57) ABSTRACT

The present invention provides a process for preparing lithium manganate having lithium-in cell stability by utilizing manganese oxides having lower oxidation states in the furnacing step and by using stoichiometric amounts of lithium hydroxide monohydrate and a manganese oxide in water as a starting mixture. Cr, Ni, Mg, AL oxides are optionally added.

11 Claims, No Drawings

PROCESS FOR PREPARING LITHIUM MANGANATE

FIELD OF THE INVENTION

The present invention relates to lithium containing manganese oxides (lithium manganate) for use as cathode material for secondary lithium batteries. More particularly, there is provided a process utilizing manganese oxides having lower oxidation stages to produce stable lithium manganates.

BACKGROUND OF THE INVENTION

As lightweight and high capacity batteries for use in portable electronic and telecommunication devices and the like such as compact video cameras, cellular phones, and portable personal computers, recently put into practical use are lithium secondary batteries employing a carbon material capable of intercalating and deintercalating lithium ions as the anode active material and a lithium-containing transition metal oxide such as a lithium-containing cobalt oxide ($LiCoO_2$) or a lithium-containing nickel oxide ($LiNiO_2$) as the cathode active material.

However, although lithium-containing transition metal oxides such as lithium-containing cobalt oxide ($LiCoO_2$), lithium-containing nickel oxide ($LiNiO_2$), and the like possess a high battery capacity, they suffered a problem that they have low thermal stability even in a fully charged state due to 50% lithium remaining in the cathode. Moreover, cobalt and nickel, which are the raw materials, are expensive, and their supply is limited. Accordingly, there is proposed a lithium secondary battery using a lithium-containing manganese oxide ($LiMn_2O_4$) having spinel type crystal structure as the cathode active material. The lithium-containing manganese oxide ($LiMn_2O_4$) is one of the promising materials for use as the cathode active material for a lithium secondary battery, in that manganese used for the raw material is abundant in resources and is inexpensive, and that it yields a high thermal stability in the charged state, such that it can increase the safety of the battery since no lithium is left in the cathode when the battery is fully charged.

U.S. Pat. No. 6,680,143 to Thackeray et al, which is herewith incorporated by reference, discloses the preparation of $xLiMO_2$ $(1-X)$ $Li_2M^1O_3$ compounds in which M is manganese and M is a tetravalent ion by a hydrothermal process under basic conditions.

U.S. Pat. No. 6,682,850 to Numata et al which is herein incorporated by reference discloses a nonaqueous electrolyte solution secondary battery using lithium-manganese composite oxide for the positive electrode. The lithium-manganese composite oxide is prepared by mixing the Li source and Mn source having a desired particle size at a mole ratio of Li/Mn which matches the lithium-manganese composite oxide and baking in an oxygen atmosphere.

U.S. Pat. No. 6,790,560 to Wakihara et al which is herein incorporated by reference, discloses a positive electrode for a lithium secondary battery which includes a lithium manganese oxide having a spinel structure including a third metal which can be chromium that is prepared by a series of heating at elevated temperatures including heating in air for three days and then calcinating under control oxygen partial pressure.

U.S. Pat. No. 6,818,351 to Sunagawa et al, which is herein incorporated by reference, discloses a positive electrode for a lithium secondary battery using a combination of a lithium containing manganese oxide having a spinel type crystal structure and lithium containing cobalt oxide.

U.S. Pat. No. 6,964,830 to Takahashi, which is herein incorporated by reference, discloses a lithium secondary lithium battery wherein lithium manganate is used as a positive active material represented by $LiMn_2O_4$. The manganate is produced by firing a mixture of salt and oxide of the respective elements in an oxidation atmosphere at 650 to 1000° C. for 5 to 50 hours.

SUMMARY OF THE INVENTION

According to the present invention, there is prepared a positive electrode material for a lithium secondary battery that comprises; a lithium manganese oxide expressed by one of the general formulae;

(where $1 \leq x \leq 1.33$ and $3-x \leq y \leq 3.1-x$); and

wherein M is an element selected from the group consisting of Mg, Al, Cr and Ni and
$1 \leq x \leq 1.33$, $3-x-z \leq y \leq 3.1-x-y$, and
$0 < z \leq 1.0$ More particularly, there is provided a process for producing a lithium manganate which comprises the steps of:

a) mixing stoichiometric amounts of lithium hydroxide monohydrate and a manganese oxide in the presence of water;

b) heating the mixture of step a) at a temperature of about 100 to 180° C. to drive off the water so as to minimize sintering in subsequent furnacing and causing partial reaction;

c) heating the product of step b) to about 650 to 900° C. for about 2 to 10 hours under an oxygen containing atmosphere and then;

d) grinding cooled product from step c) to less than 100 microns in particle size.

According to another embodiment of the invention, the oxides of the magnesium, aluminium, chromium or nickel are added in the process. Preferably about 1 to 5% by weight is added to the lithium hydroxide-manganese to prepare the compounds of formula (II).

It is an object of the invention to provide a process for preparing lithium manganate and lithium mixed oxides having enhanced stability.

It is another object of the invention to prepare lithium manganate for uses as cathode material in a secondary lithium battery.

It is yet another object of the invention to provide lithium manganate having less porosity and which does not react readily with the solvent of the battery.

It is still a further object of the invention to produce a lithium manganate having a stable structure.

It is an object of this invention to produce a more stable lithium manganate for the lithium ion batteries.

DESCRIPTION OF THE PREFERRED EMBODIMENTS

It has been found that the use of $Mn_2O_3$ or $Mn_3O_4$ or even MnO when reacted with lithium hydroxide monohydrate in two stages produces a lithium manganate which is less reactive to the electrolyte solvent such as ethylene carbonate or dimethyl carbonate. Cells made with this less reactive lithium manganate can achieve up to 300 full charge discharge cycles with over 80% of their capacity (mAh/g) retained. The reaction is represented by $$LiOH \cdot H_2O + 2Mn_2O_3 + 0.5O_2 \rightarrow 2LiMn_2O_4 + 1.5H_2O \text{ (in air or oxygen)}$$

The reason for this enhanced stability in the lithium-ion cell is due to the absence of higher oxidation states of manganese than +3.5. This is due to these states not forming during the synthesis of the present invention. Oxygen is required to enter into the reaction to oxidize the manganese to the necessary intermediate oxidation step (nominally +3.5) which is actually a stabilized mixture of 3 and 4 oxidation states during furnacing. In the case of starting from a higher oxidation state as in the prior art, the excess oxygen must be lost for the manganese to "step down" from +4 to +3.5 average. This means that when starting with $MnO_2$ (a Mn+4 valence) the resulting lithium manganate must lose the extra oxygen while being heated about 700-900° C. while it is solid. Therefore the resulting lithium manganate would have more porosity and react more readily with the solvent and the formation of a conductive protective coating would not be as effective. Another problem which is probably more serious is the fact that not all of the Mn+4 has reduced down or decomposed down to the necessary +3 sites in the crystal to achieve the average of +3.5 required. The excess +4 Mn over that required for complete formation of the $LiMn_2O_4$ (average +3.5) is far more reactive to the solvent. The reaction of $MnO_2$ (+4 Mn) with ethylene glycol is well known in organic chemistry and commercial organic synthesis. The same reaction can occur but more slowly with the ethylene carbonate which contains esterified ethylene glycol. However, $MnO_2$ (Mn+4) should be reactive to all esters if not deactivated or having a protective coating.

Also, the preferred processing method is to react the lithium hydroxide monohydrate in the presence of water with any of the manganese oxides having lower oxidation states (such as $Mn_2O_3$, $Mn_3O_4$, MnO) with stirring in the temperature range of about 90 to 150° C. and driving the water off to obtain a partially reacted solid which is ground powder. (The composition is approximately $LiMn_2O_4 \cdot H_2O$ and containing 0-40% bound water.) This powder is calcined or roasted in a furnace under air (oxygen) at temperatures from 600° C. to 900° C., preferably 650-775° C.

According to a further embodiment, water is used or is present in the reactants and forms steam and the reaction mixture is held at 90-100° C. in a closed vessel for a short time and permitting the small amount of steam generated to permit the initial reaction phase and even distribution of the lithium hydroxide over and into the manganese oxide used. The mixture is then heated further with either sparging with air (preferably is held in the 110-150° C. range). The resulting powder is screened to remove any +40 mesh particle and then calcined about 700° C. for about 3 hours (or longer). The final powder is lightly sintered and is ground through a Fitz mill to −50 mesh and then passed through a jet mill (or micronizer) to achieve a particle size of about 10-20 microns.

The present process for the lithium manganate product ($LiMn_2O_4$) is fast, accurate and is lower in cost. It is also a general process in which most lithium metal oxides and mixed metal oxides can be efficiently made with and without water.

The positive electrode material of the invention comprises a lithium manganese oxide of the general formulae:

$$Li_xMn_yO_4 \quad \text{(I)}$$

Wherein $1 \leq x \leq 1.33$ and $3-x \leq y \leq 3.1-x$ and $$Li_xMn_yM_zO_4 \quad \text{(II)}$$

Wherein M is an element selected from the group consisting of Mg, Al, Cr and Ni and
$1 \leq x \leq 1.33$, $3-x-z \leq y \leq 3.1-x-y$, and
$0 < z \leq 1.0$ Suitable electrolytes as a single solvent or a mixture of solvents that can be used with the cathodes of the invention includes ethylene carbonate (EC), diethyl carbonate (DEC), ethylmethyl carbonate (EMC), dimethyl carbonate (DMC), propylene carbonate (PC), gamma-butyrolactone (GBL), tetrahydrofuran, and include the salts $LiPF_6$ and $LiBF_4$, $LiC_4$, lithium triflate.

Although lithium hydroxide monohydrate has been used in the prior art, it usually causes too much sintering in the furnace and is difficult to handle in general. Often it is used in excess with the oxides and dry roasted or furnaced. In addition, it has a relatively coarse crystal which does not mix or react into the metal hydroxide or oxide until the higher furnace temperatures. This means that longer heating times and higher temperatures are required to allow the lithium cation to diffuse into the metal oxide solids to form the desired lithium metal oxide. It has been found that using a concentrated aqueous slurry containing only the stoichiometric amount of LiOH and the stoichiometric amount of the component metal oxide or mixed metal oxides such as $Mn_2O_3$ and heating with strong agitation to drive off the water produces a powder or nearly dry cake. Preferably this drying and heating is about 110° C. up to 150° C. to produce a dry powder which has the composition of the desired product plus the anhydrous LiOH (no water of hydration left) but it still needs some oxidation. This powder is screened or optionally ground and screened and then placed into a furnace (batch or continuous or rotary) and heated up to 650-750° C. for 2.5 to 4 hours (preferably 3 hours). The atmosphere of the furnace can be dry air or oxygen free of carbon dioxide. The bed is kept less than ¾ inch thick if stationary or it is rotated. It is believe the $CO_2$ should be kept out of the furnacing atmosphere and particularly on the cool down and grinding to obtain the best quality material. We have found that the manganese oxide oxidizes rapidly under these conditions and produces the desired lithium manganate as demonstrated by x-ray diffraction. The lightly sintered product is cooled under dry air (no $CO_2$) or oxygen and then readily ground to the desired battery grade cathode material for lithium-ion batteries.

Testing in prismatic lithium-ion cells has shown that this material has higher capacity (135 mAh/g) than the currently available commercial lithium manganate materials (125-130 mAh/g). The charge/discharge cycling of this lithium manganate demonstrates that it is more stable on repeated cycling than the currently available lithium manganate. About 70% of the initial cell capacity is maintained over 300 cycles with 100% depth of discharge at C/5 discharge rate. (Capacity of the cell discharges over 5 hours).

All of the metal hydroxides and oxides oxidize to their most stable oxidation level readily under these conditions. (Cobalt from +2 to +3 and manganese up to +3.5 in the presence of the lithium cation). This has not been recognized by past patents and publications. This has allowed lower cost and more readily available starting materials such as the lower oxidation state oxides and hydroxides of the various metals and gives a more stable cathode material. The conditions are more mild than the normal commercial processes (shorter processing times and lower temperatures are needed), and a minimum amount of grinding is required because sintering is reduced. Current commercial processes which use a mixture of lithium carbonate and the metal oxide ($MnO_2$) at higher temperatures (700° C.) obtain heavy sintering and poor mixing of the constituents requiring excessive grinding followed by further furnacing at even a higher temperature. The product is taken and ground and reintroduced back into another furnace and heated up to about 900° C. for 4-12 hours and this product requires extensive grinding (jet mill) (a total of two intensive grinding procedures). In the present process, one is able to preserve most of the fine particle size of the original metal hydroxide or oxide through the whole process with only moderate sintering. Only moderate grinding is required. This produces a relatively high surface area and particle integrity, and very good discharge rates and long term cycling stability in lithium-ion cells/batteries are obtained.

Further stabilization for the lithium manganate is obtained, by adding 1-5% of chromium metal or a chromium oxide, $Cr_2O_3$ (or as the nitrate, acetate or other salt) to the lithium hydroxide manganese oxide mixture last while the slurry is being heated and stirred. Other metals which can be used in lieu of chromium include nickel, manganese and aluminum.

The following examples are merely illustrative of the invention.

Example 1

Lithium Manganate 251 g (1.58 m) $Mn_2O_3$ was added to a stainless steel mixing bowl with stirrer and then 300 ml distilled water and 68 g (1.58 m) lithium hydroxide monohydrate was added and blanketed with nitrogen. The mixture was heated to about 100° C. while sweeping with nitrogen purge to remove the water. After 5 hours, only a dry black powder was obtained. This was furnaced at 710° C. for 5 hours. The lightly sintered powder was then ball milled. The powder lost no weight from the furnacing under air. XRD (x-ray defraction) showed essentially pure $LiMn_2O_4$.

Results

Evaluation as a cathode material in a prismatic lithium-ion cell with MCMB (meso carbon micro beads) anode and 1 M $LiPF_6$ in EC/EMC/DMC as electrolyte gave a gravimetric capacity of 130 mAh/g and the cell showed 70% retention of capacity after 200 cycles at 100% depth of discharge at C/5.

Example 2

Lithium Manganate+2% $Cr_2O_3$ 633 g (4.01 m) $Mn_2O_3$ was added to a stainless steel mixing bowl with stirrer and then 400 ml distilled water and 178 g (4.238 m) lithium hydroxide monohydrate. The mixture was blanketed with nitrogen. Then a solution of 76 g $Cr(NO_3)_3 \cdot 9H_2O$ (0.38 m) in 100 ml water was added slowly over 10 minutes. The mixture was heated up to about 130° C. over 4 hours while sweeping with nitrogen purge to remove the water. Only a dry black powder was obtained. This was furnaced at 750° C. for 3 hours. The lightly sintered powder was then screened through −40 mesh. There was no weight loss on furnacing. The powder lost no weight from the furnacing under air.

Results

Evaluation as a cathode material in a prismatic lithium-ion cell with MCMB anode and 1 M $LiPF_6$ in EC/EMC/DMC (1:1:1) as electrolyte gave a gravimetric capacity of 135 mAh/g and the cell showed 80% retention of capacity after 300 cycles at 100% depth of discharge at C/5.

What is claimed is:

1. A process of producing electrode material for the cathode of a lithium battery having the general formula:

$$Li_xMn_yO_4 \quad (I)$$

Wherein $1 \leq x \leq 1.33$ and $3-x \leq y \leq 3.1-x$ and $$Li_xMn_yM_zO_4 \quad (II)$$

Wherein M is an element selected from the group consisting of Mg, Al, Cr and Ni and
$1 \leq x 1.33$, $3-x-z \leq y \leq 3.1-x-y$ and
$0 < z \leq 1.0$ which comprises the steps of preparing the material of formula (I) by the steps of:
 a) mixing stoichiometric amounts of lithium hydroxide monohydrate and a manganese oxide in the presence of water;
 b) heating the mixture of step a) at a temperature of about 100 to 180° C. to drive off water to obtain $LiMn_2O_4 \cdot H_2O$;
 c) heating the product of step b) to about 650° C. to 900° C. for about 2 to 10 hours, to reduce manganese to Mn+3, and then
 d) grinding the product of step c) to less than 100 microns in size, and including in step a) the addition of M oxide wherein M is as herein before described to produce a lithium manganate of formula (II).

2. The process of claim 1 wherein $LiMn_2O_4$ is produced by using in step
 a) $Mn_2O_3$ as the starting material.

3. The process of claim 1 wherein about 0.5 to 5% by weight of chromium oxide is added to step a).

4. The process of claim 1 wherein 0.5 to 5% by weight of the chromium is added as a salt.

5. The process of claim 1 wherein air is utilized to oxidize manganese oxide.

6. The process of claim 1 wherein nickel oxide is added to step a).

7. The process of claim 1 wherein step b) is performed under vacuum.

8. The process of claim 1 wherein step a) is performed under a nitrogen atmosphere.

9. The process of claim 1 wherein manganese oxide in step a) is selected from the group consisting of $Mn_2O_3$, $Mn_3O_4$ and MnO.

10. The process of claim 1 wherein step c) is performed by calcining in a furnace under air.

11. The process of claim 1 wherein the product of step d) is ground to about 10 to 20 microns.

* * * * *